United States Patent Office 3,158,648
Patented Nov. 24, 1964

3,158,648
DIRECT RESOLUTION OF α-METHYL-3,4-
DIHYDROXYPHENYLALANINE
Robert T. Jones, Plainfield, Kenneth H. Krieger, Chatham, and James Lago, Murray Hill, N.J., assignors to Merck & Co., Inc., Rahway, N.J., a corporation of New Jersey
No Drawing. Filed Apr. 9, 1962, Ser. No. 185,815
20 Claims. (Cl. 260—519)

This invention relates to a new process for obtaining the optical isomers of α-methyl-3,4-dihydroxyphenylalanine in substantially pure form. More specifically, this invention relates to a process for obtaining the optical enantiomorphs of α - methyl-3,4-dihydroxyphenylalanine (sometimes referred to as α-methylDOPA) in substantially pure form which comprises contacting a supersaturated aqueous solution of the racemic form with crystalline seed of the desired isomer, the said solution containing from 0 to 90% of said alanine compound in the form of the amine salt of a salt-forming acid, the said salt-forming acid being a water-soluble nonamphoteric acid. More specifically, also, it relates to a process of resolving α-methylDOPA into its substantially pure enantiomorphs by dissolving the racemate in aqueous solution containing from 0 to 90% of the acid needed to form the amine salt, transforming the said solution into a supersaturated solution of the above description, contacting said supersaturated solution with one enantiomorph in crystalline form, separating the mother liquor and contacting the mother liquor, with or without increase in the supersaturation, with the other enantiomorph. More specifically also, it relates to continuous methods of operating such a resolution. In one such method the mother liquor from the second crystallization above is recycled into the dissolving of the racemate and the crystallized enantiomorphs are withdrawn from each crystallization continuously or intermittently. In another the process of continuously resolving α-methylDOPA comprises dissolving the racemate in aqueous solution usually containing some acid, dividing the solution into two equal parts, forming a supersaturated solution of the above description with each part, contacting each such supersaturated solution with one of the enantiomorphs, one with the D form and the other with the L form, and recycling the mother liquors to the dissolving step, the crystallized enantiomorphs being isolated from the slurries continuously or intermittently.

This application is a continuation-in-part of our copending application, Serial No. 123,115, filed July 11, 1961, now abandoned.

L-α-methyl-3,4-dihydroxyphenylalanine is an important new antihypertensive drug. The D form, while completely inactive as a hypotensive agent, is found to have the same toxicity as the L form. It is, therefore, important that the D form be separated since it contributes nothing to the antihypertensive effect. The antihypertensive activity of this compound is all in the L form.

Heretofore, the resolution of the α-methyl-3,4-dihydroxyphenylalanine has been an expensive and time-consuming process. The classical method, making diastereomeric salts with either optically-active bases or optically-active acids, has perforce been followed (as disclosed in the abandoned application of Reinhold et al., Serial No. 20,813, filed April 8, 1960, now abandoned). Such a process adds tremendously to the cost of the drug. It is, therefore, imperative that the resolution of the racemic mixture be carried out in the simplest and cheapest manner possible.

We have found that it is possible selectively to crystallize each enantiomorph in turn in substantially pure form from an aqueous solution of the racemic α-methyl-3,4-dihydroxyphenylalanine by forming a supersaturated solution and contacting it with seed crystals of the desired enantiomorph. The formation of the supersaturated solution can be carried out in the presence of the seed or the supersaturated solution can be later seeded. The steps of forming and contacting with seed can thus be simultaneous or successive as conditions necessitate. The key to such a crystallization is to be found in keeping the dissolving acid usage at such a proportion to the phenylalanine compound usage that from 0 to 90% of the latter compound, and no more, is present as the amine salt of the salt-forming acid, the remainder being present as the free phenylalanine base. The α-methylDOPA is present in the supersaturated solution substantially as racemate. Excesses of one enantiomorph may occur because of removal of some of the other from the solution in a prior crystallization before recycling the mother liquor. Although no one crystallization separates all of a specific isomer, by isolating the L form and the D form separately in this manner with the addition of make-up racemate between each isolation or each such pair of isolations, in order to keep the solution saturated or nearly saturated in order to facilitate the formation of supersaturated solutions, it is possible to approach complete isolation of all of the L form.

The salt-forming acids which may be used include any non-amphoteric water-soluble acid. Those acids which have at least one acidic hydrogen with an ionization constant greater than $10^{-3}$ and which are nonoxidizing are preferred. Because of the sensitivity of the hydroxyls of this compound to oxidation to form quinoid structures, it is preferred that the acid be nonoxidizing. Thus, the term "nonoxidizing" is intended to describe an acid to which these hydroxyls are inert at the temperature and concentration used. At low temperatures and good dilution, acids such as nitric acid which are otherwise regarded as oxidizing can be inert. The minimum ionization constant is preferable in order to provide sufficiently strong acid to form readily the phenylalanine salts when more than very small amounts of acid are used, the acid thus adding to the amount of said phenylalanine in solution. When only small or trace amounts of acid are used for the sole purpose of keeping the solution non-alkaline, any acid soluble in the solvent, usually water, is usable. In the case of poly-basic acids, only those ionizable hydrogens with a Ka greater than $10^{-3}$ are of importance when large proportions of acid are used. Acids which we prefer to use include hydrochloric acid, hydrobromic acid, sulfuric acid, sulfurous acid, monochloroacetic acid, dichloroacetic acid, trichloroacetic acid, phosphorous acid, phosphoric acid and the like. Other acids such as acetic, dilute, nitric, perchloric, etc. can also be used but are prefarably avoided because of either weak acid strength, which reduces the amount dissolved or their oxidizing character. The acids should be nonamphoteric (i.e., amino acids are not advisable) because of the zwitterion character of their neutral form. Their free carboxy form requires other acidic hydrogen ions to neutralize the amino groups which can just as well be used to dissolve the phenylalanine compound.

The first ionization constant of most poly-basic acids is the only important one in the preferred embodiment since in most cases it is the only one with a Ka greater than $10^{-3}$. In such cases the salt-forming acid's function is to neutralize the amino group to form the acid salts such as the bisulfite. In special cases, such as $H_2SO_4$, the second acidic hydrogen also has an ionization constant in the desired range and neutral salts are obtained. The ratio of moles of amino acid in solution to equivalents of acidic hydrogen with Ka greater than $10^{-3}$ should, in the preferred embodiment, be such that from 0 to 90% of the amino acid is in the form of the amine salt in the final supersaturated solution from which the desired enantiomorph is to be separated. Thus, there must be some (above 10%) of the free base present. The desired enantiomorph crystallizes as the free base leaving a mother liquor still supersaturated in the other enantiomorph. The maximum recovery of the desired enantiomorph in any one crystallization is the amount present as the free base. Above 90% of the amino acid as the amine salt, the recovery is small. Although the solubility of the free amino acid in water is less than that of the amine salt; in at least one method of operating our invention the amino acid can be present substantially all as free amine, with little or no neutralizing acid present. The solution must never be on the alkaline side in the presence of air because of decomposition, and thus usually at least a trace of a neutralizing acid is preferably present to enhance stability. However, the process of the invention can be carried out in the absence of acid and, if air is excluded, even on the alkaline side, using salts of the carboxyl function group. It is, however, easier to work at neutral pH or preferably with at least a trace of acid.

The process of this invention is carried out in solution in a polar solvent, preferably an aqueous solvent, by which is meant a solvent containing at least 10% water by volume. The solvent can be any water miscible polar solvent such as a lower alcohol (methanol, ethanol, sec-butanol, etc.) dioxane, acetone and the like. With solvents other than the alcohols, water is needed to help form the dissolving acid when $SO_2$ is used to dissolve the amino acid.

The formation of supersaturated solutions in our invention can be carried out in several different ways. One of the most common ways is by use of change of solubility with temperature. Thus, a saturated solution is formed at one temperature (e.g., 30–45° C.) and cooled in the presence of the seeding crystals to a lower temperature (e.g. below 25° C.). This procedure, using these temperature ranges, gives very excellent results provided the amino acid is in the proper allotropic form. Racemic α-methyl-3,4-dihydroxyphenylalanine has been found to form several different allotropic crystal forms. These forms differ in their solubility gradient with temperature. One particular form, found to have a good temperature gradient, is characterized by X-ray peaks ($2\theta$ copper $K\alpha$) at 9°, 11°, and 23°. This form IIA, however, is unstable and changes into the stable form I in contact with water, even at room temperature. While the change is slow at low temperature, it becomes faster as the temperature is raised. The stable form I is characterized by X-ray peaks ($2\theta$ copper $K\alpha$) at 10° and 13°. The temperature gradient of the solubility of form I is small, below 50° C., but becomes much larger, surprisingly at higher temperatures. Thus, it is possible to dissolve the racemic material at temperatures between 60° and 100° C. and to form the supersaturated solution by cooling to temperatures in the range of 5 to 40° C. Since form I is the stable form to which the others are transformed, this mode of operation is preferred when using the thermal method of supersaturating. It is an especially preferred method of resolving α-methylDOPA continuously.

In general, the greater the difference between the temperature of forming the saturated solution and the temperature of crystallization, the greater the tendency for racemate to precipitate. It is, therefore, necessary to keep the temperature differential between these two operations as low as practical while maintaining a satisfactory rate of crystallization. A differential of at least 10° C. is necessary. The difference between the dissolving and crystallizing temperatures should not exceed 60° C. since beyond that differential racemic material tends to precipitate. The stable form I, although having a comparatively flat temperature solubility curve at low temperature, can thus be used in the temperature differential method by using higher temperatures, up to 100°.

The preferred temperature differential procedure, in general, is to make up a saturated solution of the racemate at 60–100° C., preferably at about 75° C. in water containing a small amount (e.g., less than 0.2 equivalent per mole of alanine) of an acid such as hydrochloric acid or sulfurous acid to get a solution of α-methylDOPA having from 0 to 20% of the amino acid in the salt form. The ratio of amino acid salt to amino acid is conveniently controlled by adding excess phenylalanine compound to a given amount of acid. Preferably, only a trace of acid, usually sulfurous, is present for stability. The undissolved racemate is filtered and the filtrate automatically contains amino acid plus amino acid hydrochloride or bisulfite dissolved in the solution. The filtrate is seeded with crystals of the desired enantiomorph. The seeded solution is then cooled to 5 to 40° C., preferably to about 35° C.

While the foregoing is the preferred method of using temperature differences to form a supersaturated solution, the process can also be used with lower dissolving and crystallizing temperatures. Thus, the racemate may be dissolved at 35° C. and cooled below 20° C. Because of the flat solubility gradient in this range such operations are not as efficient as the use of the preferred ranges, especially when low amounts of acid are present.

The cooled seeded solution, which is either saturated or still somewhat supersaturated in the desired enantiomorph depending on the aging time and still supersaturated with the other enantiomorph, is filtered to give a 30–50% recovery of one of the enantiomorphs at purities ranging from 95–100%. Usage of seed crystals of the desired enantiomorph will vary with the mode of operation. Preferably at least 5 g. of seed per liter of super-saturated solution is added, usually 150 g. per liter or even more. The amount of seed crystals used is a practical matter. The upper limit is a function of the viscosity of the slurry. The amount of seed to use also depends in part on the particle size since smaller particles have more seeding area per unit weight. The seeding efficiency (i.e., the combination of the amount and the particle size) controls the rate of discharge of the supersaturation. If the amount is low or the particles are large, the rate is slow. Large amounts and small particle size increase the rate of crystallization. The slower the rate the more contamination is possible.

A second alternative method of forming a super-saturated solution is to operate at a constant temperature but to change the amount of salt-forming acid present by neutralization. This procedure is especially advantageous when the amino acid has become transformed into one of the allotropic forms having a very low temperature differential of solubility. The method consists of preparing a solution in the salt-forming acid. The latter need not, but can be, in excess, in which case the solution is not saturated and has all the amino acid as the amine salt. If it is in excess, more base is needed to form a saturated and then a supersaturated solution and thus to free some amino acid from the amine salt. It is preferable to form a saturated solution by not using excess acid. The undissolved material is again separated and then a base is added. As the dissolving acid is neutralized, a super-saturated solution is formed. The amino acid to salt-forming acid ratio must again be such that 0 to 90% of the α-methylDOPA is present as the free amine. The neutralization is either carried out slowly in the presence of seed crystals of one of the enantiomorphs or the supersaturated solution thus formed is later seeded with efficient agitation. The neutralization technique can be used either at constant temperature or in conjunction with a temperature change, although it is generally better to keep the mixture at a constant temperature in order to avoid racemate from contaminating the product. The neutralization can be carried out with any base desired such as, e.g., ammonium hydroxide, sodium hydroxide, lime, magnesia, potassium hydroxide and the like, as well as the carbonates or bicarbonates of these metallic ions. When the cation forms soluble salts with both the dissolving acid and the phenylalanine compound, the neutralization technique can be used in the presence of seed. When insoluble salts are formed with the salt-forming acid, the supersaturated solution must be filtered before seeding. Bases forming insoluble salts of α-methylDOPA should be eschewed since they will neutralize the wrong acid and remove racemate from solution.

Another method of forming a supersaturated solution is by volatilization of the solvent, either by raising the temperature or by lowering the pressure, from the saturated solution. This method is especially usable when the aqueous solution contains a minor amount of a polar solvent, such as methanol, which is highly volatile.

Another method of forming the supersaturated solution is to dissolve the amino acid in an excess of an acid which has an acid anhydride volatile from aqueous solution and to transform this into a supersaturated solution by volatilization of the acid anhydride of the dissolving acid from the saturated solution. An example of such an acid is sulfurous acid, whose first ionization constant, only, is above $10^{-3}$. Thus, in the performance of this variation, a saturated solution of the racemic amino acid as the bisulfite salt is formed by bubbling sulfur dioxide into a slurry of the phenylalanine compound or by adding an excess of α-methylDOPA to a solution of $SO_2$ in water. An excess of the amino acid must be used in either case in order to have at least 10% of the dissolved amino acid present in the final supersaturated solution as the free base. The undissolved material is separated and the filtrate is seeded as before. The seeded filtrate is then boiled either at atmospheric pressure by heating, or under reduced pressure, or sparged with an inert gas such as nitrogen to remove some of the $SO_2$, and thus form a solution supersaturated in free amino acid. Again, optically-active amino acid of excellent purity can be isolated by filtration.

The process is especially advantageous in its adaptability to a continuous process. One advantage is the ease with which the process is controlled in a continuous operation. Another is that, unlike the neutralization technique, there is no build-up of inorganic salts in the recycling mother liquor. However, for economic reasons the thermal method is preferred.

A very important advantage of our entire invention, whether batch or continuous but especially in a continuous process, is the purity of the enantiomorph recovered. Whether operated in batches or continuously the process of this invention is remarkable in yielding substantially pure isomer (i.e., containing over 97% of one enantiomorph over the other and usually approaching 100%). No other simple direct process reported to be used with other compounds gives such complete resolution in the cases reported and no other continuous resolution is described.

A continuous process is carried out by running a saturated or nearly saturated solution of α-methylDOPA in non-alkaline aqueous solution into separate crystallizing vessels containing seed enantiomorphs and forming supersaturated solutions continuously in the presence of the seed of each enantiomorph, which then crystallizes out in part. The separate crystallizations of each enantiomorph can be carried out in series or in parallel. When the crystallizations are carried out in series, the mother liquor from the first such crystallization is continuously run into the next and its mother liquor is continuously recycled to a dissolving vessel feeding saturated solution into the crystallizing vessels. When the crystallizations are run in parallel, the saturated solution stream is divided into two parts, each going to one of the crystallizers, and the mother liquors are reunited and recycled to the dissolving step. Additional racemate is regularly charged to the dissolving vessel to keep its output saturated by keeping solid racemate present at all times. It is possible to effect the complete resolution of the racemic amino acid into its enantiomorphs by this technique.

The continuous character of this process is dependent on control of the rates of transferring the respective solutions to each successive vessel in the circuit so as to maintain constantly in each crystallizer the proper conditions for crystallization of the seeded enantiomorph. The dissolving vessel is held at the proper temperature if a temperature technique for forming the supersaturated solution is being employed, or treated with $SO_2$, if the volatile acid anhydride technique is used, at a controlled rate. More racemate is charged intermittently to keep a solid phase always present in the dissolving vessel. The saturated solution is withdrawn at a controlled rate through a filter intake (to present solid racemate from being transported) and is run into the first seeded crystallizing vessel. In the crystallizer, the supersaturated solution is continuously formed in the presence of the seed crystals (by maintaining the temperature at the right range, continuously adding a neutralizing base, sparging with an inert gas, maintaining a lower pressure, etc., depending on the technique being used).

In the series technique, the mother liquor (which is now supersaturated in one enantiomorph but not in the other) is continuously withdrawn again through a filtering intake to the second crystallizing vessel, seeded with the other enantiomorph. The second crystallizer feeds its mother liquor similarly back to the dissolving vessel and the rate of each such transfer is carefully controlled to form a balanced system. In order to make sure that substantially all the second enantiomorph in excess of a racemic mixture is recovered in the second crystallizer, it is preferred that an additional but smaller amount of $SO_2$ be sparged also from this crystallizer or, in the case of the temperature differential method, that the second crystallizer be at a slightly lower temperature, but this is not absolutely necessary for recovery of some of the second enantiomorph. Each crystallizing vessel is fitted with a slurry removal line and the crystallized enantiomorphs are removed regularly to prevent the slurry from becoming too thick. The slurries thus removed are filtered and the filtrates are either returned to the vessel from which the slurry was withdrawn or to the dissolver.

In the parallel technique, the saturated solution is divided and continuously run into separate crystallizing vessels. The slurry of crystallized enantiomorph is kept agitated and overflow is run through a filter. The mother liquors are recombined and recycled to the dissolving vessel.

Our invention can be illustrated by the following examples:

*Example 1*

Thirty-seven grams of racemic α-methyl-3,4-dihydroxyphenylalanine are slurried at 35° C. in 100 cc. of 1.0 N hydrochloric acid. The excess solids are filtered leaving a saturated solution containing 34.6 g. of racemic amino acid of which about 61% is present as the hydrochloride. The solution is then seeded at 35° C. with 7 g. of hydrated L-α-methyl-3,4-dihydroxyphenylalanine (6.2 g. of anhydrous material). The mixture is then cooled to 20° C. in 30 minutes and aged one hour at 20° C. The separated material is isolated by filtration, washed twice with 10 cc. of cold water and dried in vacuo. The yield of product is 14.1 g. of L-α-methyl-3,4-dihydroxyphenylalanine in the form of a sesquihydrate of 100% purity as determined by the rotation of the copper complex.

A portion of the mother liquors from the preceding step (45 ml.) contain 3.65 g. of hydrochloric acid and 10.4 g. of α-methyl-3,4-dihydroxyphenylalanine in which there is a 61% excess of D-form. The mother liquor is heated to 35° C. and stirred with 2.4 g. of racemate. Excess solids are removed by filtration leaving a filtrate solution containing about 12.2 g. of α-methylDOPA consisting of 67% hydrochloride. The filtrate is seeded at 35° C. with 2.7 g. of hydrated D-α-methyl-3,4-dihydroxyphenylalanine (2.4 g. of anhydrous). The mixture is then cooled to 20° C. over 30 minutes and aged one hour at 20° C. The precipitated material is isolated by filtration, washed twice with 5 cc. of cold water and dried in vacuo. A total of 5.5 g. of D-α-methyl-3,4-dihydroxyphenylalanine in the form of a sesquihydrate of 100% purity is obtained. The mother liquors contain the racemic amino acid with only negligible excess of either enantiomorph. These mother liquors are then recycled in the above process by being used as the acid solution to make up the original reaction mixture.

*Example 2*

Ten grams of DL-α-methyl-3,4-dihydroxyphenylalanine [crystalline form 2A characterized by X-ray peaks ($2\theta$ copper Ka) at 9°, 11° and 23°] is added to 50 cc. of 0.5 N hydrochloric acid solution at 35° C. The resultant suspension is agitated for 30 minutes at 35° C. The undissolved solids are filtered off and, after drying, weigh 0.22 gram. Filtrate and slurry temperature are held at 35° C. during the filtration. 1.5 grams of L-α-methyl-3,4-dihydroxyphenylalanine are added to the filtrate which is still at 35° C. The seeded filtrate is then cooled to 20° C. at a rate of ½° C. per minute, aged for one hour and filtered. The wet cake weighs 4.11 grams (2.93 grams after drying at 40° C). The product is the sesquihydrate and the specific rotation, at a wave length of light of 589 m$\mu$, of the copper salt is +170°. The yield of isomer is 26%.

*Example 3*

Forty-eight grams of DL-α-methyl-3,4-dihydroxyphenylalanine [form I, characterized by X-ray peaks ($2\theta$ copper Ka) at 10° and 13°] is slurried in 100 cc. of 2.0 N hydrochloric acid at 25° C. for one hour. The undissolved solids are filtered off and dried. Dry weight of these solids is 0.90 gram. 8.0 grams of L-α-methyl-3,4-dihydroxyphenylalanine seed are added to the filtrate. 40 cc. of 2 N sodium hydroxide are added to the filtrate at a rate of ½ cc. per minute. Temperature is maintained at 25° C. The suspension is aged for one hour at 25° C. and then filtered. Weight of the dry product (including seed) is 18.5 grams. The product is L-α-methyl-3,4-dihydroxyphenylalanine sesquihydrate and the specific rotation, at a wave length of light of 589 m$\mu$, of its copper salt is +170°. Yield of isomer is 39%.

*Example 4*

Thirty-five grams of DL-α-methyl-3,4-dihydroxyphenylalanine is slurried in 200 cc. of 0.46 molar sulfur dioxide aqueous solution at 24° C. After 70 minutes, the slurry is pressure filtered (using nitrogen for driving force). Weight of the dry undissolved solids is 10.8 grams. 210 cc. (total=214 cc.) of the filtrate and 12.6 grams of D-α-methyl-3,4-dihydroxyphenylalanine are charged to a 500 cc. Morton flask equipped with agitator and nitrogen inlet tubes. With agitator turning at 420 r.p.m., 0.42 ft.³ of nitrogen is fed through a wet test meter and then through the crystallizer flask over a 35-minute period. The slurry is aged for one hour at 24° C. and then pressure filtered (using nitrogen for driving force). The product weight (including seed) is 14.6 grams. The mother liquors are titrated with sodium hydroxide to the blue end point of brom cresol green. The sulfur dioxide content is assumed equal to the caustic solution used. Sulfur dioxide concentration by this technique is 0.28 M. The product is D-α-methyl-3,4-dihydroxyphenylalanine sesquihydrate and the specific rotation of the copper salt at 589 m$\mu$ is −175°. The yield of D isomer is 17%.

*Example 5*

The apparatus used for continuous crystallization consists of 3 l. Pyrex glass resin kettles equipped with 4 glass baffles and a 4 bladed turbine impeller. Each vessel is fitted with an internal filter (⅝″ OD x 4″ long) of medium porosity Pyrex. Use of this filter permits operation at any desired suspended solids concentration. A withdrawal line for slurry removal is also included in each crystallizer (i.e., in two of the vessels). Temperature control is by immersing the vessels in a thermostatically controlled bath. Each vessel is equipped with a thermometer for temperature measurement. Solutions are pumped from one vessel to the other in a closed circuit using peristaltic pumps and rubber tubing. Nitrogen is supplied to the crystallizers through rotameters. The dissolver kettle is fitted with a rotameter for measurement of sulfur dioxide addition.

Operation of a typical run is described below. Each vessel is charged with the liquor in that vessel from the previous run. Water bath temperature is adjusted to 42° C. to give an internal vessel temperature of 40° C. 94.3 g. of L seed are added to the L crystallizer, 98.4 grams of D seed to the D crystallizer and 458 grams of α-methyl-3,4-dihydroxyphenylalanine which had been filtered from the contents of the dissolver in the previous run, to the dissolver. The peristaltic pumps are started and adjusted to deliver 50 cc./minute. Sulfur dioxide is fed to dissolver at 1 liter/minute. Nitrogen is sparged through the D crystallizer at 4.8 liters/minute and through the L crystallizer at .96 liter/minute. Thirty grams of DL-α-methyl-3,4-dihydroxyphenylalanine are added to the dissolver each half hour. Samples are withdrawn from each vessel at ½ hour intervals and assayed for sulfur dioxide content by caustic titration to the blue end point of brom cresol green and for α-methylDOPA content by ultraviolet absorption at 281 m$\mu$ in a Beckman spectrophotometer. These values are reasonably constant and may be summarized as follows:

|  | SO$_2$ Concentration (moles/liter) | α-MethylDOPA Concentration (moles/liter) |
|---|---|---|
| Dissolver | 0.63 | 0.58 |
| D-Crystallizer | 0.30 | .515 |
| L-Crystallizer | 0.25 | .47 |

After operating at these conditions for 6 hours, the run is stopped. The contents of each vessel are filtered. Two hundred fifty-eight grams of D isomer (including seed) are recovered from the D crystallizer, 267 grams of L isomer from the L crystallizer and 359 grams of DL crystal from the dissolver. The isomers are the sesquihydrates. The rotation at 589 m$\mu$ of the copper salt of the L isomer is +172° and of the D isomer is −170°. The productivity of L-isomer per 1.5 liter of crystallizing capacity is 26 grams/hour. The yield is 97.4%.

In starting up the continuous system for the initial run, the dissolver vessel is charged with 3 liters of water and SO$_2$ is run in at the rate of 1.8 liters/minute. About 1 kg. of racemate is added. When the SO$_2$ content is 0.64 M., the transfer of saturated solution through the internal filter to the D crystallizer is begun at 50 cc./minute. Water is then charged to the dissolver at the same rate to maintain a constant volume. Every half-hour, 28 g. more racemate is also charged to the dissolver.

When the D crystallizer vessel contains 1200 cc., a stream of nitrogen at 4.8 liters/minute is begun. A charge of 100 g. of D-α-methylDOPA is added. When the D crystallizer contains 1500 cc., the withdrawal of mother liquor at 50 cc./minute through the internal filter is begun, this first mother liquor being pumped to the L-crystallizer.

When the L crystallizer contains 1200 cc. of solution, 100 g. of L-α-methylDOPA is added and sparging with nitrogen at the rate of 0.96 l./minute is begun. When the L-crystallizer contains 1500 cc. the withdrawal of mother liquor through the internal filter at 50 cc./minute is begun. This second mother liquor is charged to the dissolver vessel and the addition of make-up water is ceased. The system is then at the continuous phase, to be used as described above.

*Example 6*

The apparatus consists of three 3-liter resin kettles, three pumps, one internal porous filter, two product filters, agitators, thermometers, rubber hose, and constant temperature baths. They are set up as follows: The first kettle, the dissolver, is equipped with agitator, thermometer, bath and the internal porous filter. The line from the filter divides into two lines, each of which passes through a pump and into a different one of the other two kettles (the crystallizers). Each of the latter is likewise fitted with a thermometer, agitator and bath. The overflow from each kettle goes into a product filter. The filtrate lines from these latter are combined and pass through a pump back to the dissolver kettle.

At the start, the system is charged as follows:

To the dissolver is charged 2,600 ml. of 0.1 N hydrochloric acid and 226 gms. of DL-α-methyldihydroxyphenylalanine. This slurry is heated to 35° C. with a water bath and maintained at 35° C. throughout the operation. In the crystallizers, 152.4 gms. of DL-α-methyldihyldroxy-phenylalanine is dissolved in 3100 ml. of 0.1 N hydrochloric acid at 20° C. The solution is filtered to insure absence of suspended particles and charged to the crystallizers—1550 ml. to the D-crystallizer and 1610 ml. to the L-crystallizer. Both vessels are held at 20° C. by a water bath during the operation. 17.7 grams of high purity D-α-methyldihydroxyphenylalanine (as the hydrate) is added to the D-crystallizer and 17.7 gms. of the L-isomer (as the hydrate) to the L-crystallizer.

The resolving crystallization is accomplished by pumping from the dissolver through the internal porous filter, a solution of DL-α-methyldihydroxyphenylalanine at a rate of 24 ml. per minute. This flow is adjusted to deliver 12 ml. per minute to each (D and L) crystallizer. From each crystallizer a slurry of the respective isomer in the crystallization liquor overflows to an enclosed product filter. From each filter at regular intervals, an equal volume of D mother liquor and L mother liquor is returned to the dissolver feed funnel where the two streams are mixed and returned to the dissolving kettle.

During nine hours of operation, 108.2 grams of DL-α-methyldihydroxyphenylalanine (solid) are charged to the dissolver. Similarly, an additional 8.85 grams of pure D and L isomers (solids) are charged to their respective crystallizers. At the completion of the run, slurries in each vessel are filtered separately and the solids and clear liquid measured and assayed. From these filtrations and the continuous product filters, there are obtained 47.75 grams of D-isomer (as the hydrate) and 51.8 grams of L-isomer (as the hydrate) representing a net gain (above the weight of seed crystals) of 21.25 grams of D-isomer and 24.8 grams of L-isomer. Optical purity of these products is determined by the rotation of a solution of the aluminum complex as $[\alpha]_D = +26.3°$, $[\alpha]_D = -26.2°$.

Analysis of the liquors and undissolved solids from the dissolver proves an α-methyldihydroxyphenylalanine balance of 98.5%.

Example 7

Fifteen grams of DL-α-methylDOPA is slurried in 200 cc. of 0.001 N hydrochloric acid for 30 minutes at 35° C. The slurry is filtered and the filtrate is seeded with 1.75 g. of L-α-methylDOPA sequihydrate. The solution is cooled at ½° C. per minute to 20° C. and there stirred gently for one hour. The product is filtered, washed twice with 3 cc. of cold water and dried in vacuo. The net anhydrous product is 1.5 g. of 99% optical purity.

Example 8

Two grams of DL-α-methylDOPA is dissolved in 50 cc. of distilled water by heating to 75° C. The solution is filtered and seeded with 0.500 gram of L-α-methylDOPA sequihydrate. It is then cooled to 25° C. and aged 1.5 hours with gentle agitation. The product is filtered, washed with 4 cc. of cold water and dried in vacuo. The net anhydrous product obtained is 191 mg. of 100% optical purity.

Example 9

The apparatus consists of three 3 l. vessels, each surrounded by a heating or cooling bath. Each vessel is fitted with a stirrer and an internal filter leading to an exit line. The first vessel, the dissolver, contains solid DL-α-methylDOPA as well as saturated solution. Its bath is maintained at 75° C. The exit line from its internal filter divides into two lines, each leading to one of the other vessels, the crystallizers, through a metering pump and a heat exchanger. The latter are maintained at 45° C. by circulation of cooling water through the jacket. Each line then passes through a second filter (to prevent any racemate which might have crystallized in the heat exchangers from contaminating the crystallization) into one of the crystallizers. The baths surrounding these vessels are maintained at 35° C. and each contains supersaturated solution and the seed of an enantiomorph, as described below. The exit line from the internal filter in each crystallizer passes through a metering pump and then they unite to form a return line to the dissolver.

To start the experiment, the crystallizers are charged initially with solutions of racemate almost saturated at the bath temperature (35° C.) but free of dissolved material. These solutions contain 0.069 equivalent of $SO_2$ per liter. Each crystallizer is then charged with 225 grams of seed per liter of solution. One crystallizer receives seed of the D form and the other that of the L form. The dissolver is then charged with solid racemate and saturated solution containing 0.069 equivalent of $SO_2$ per liter and heated with stirring until the solution is saturated at the dissolver temperature (75° C.). This solution is then pumped through the exit lines into the crystallizer at such a rate that nominal residence time in each crystallizer is one hour. At the same time the mother liquors from the crystallizers are pumped back to the dissolver at an equal rate. The pumping is continued in this circuit with discontinuous addition of solid racemate to the dissolver in order to keep solid racemate present. Portions of the slurries from the crystallizers are intermittently withdrawn from each crystallizer, filtered and the filtrate returned to the dissolver, using a line separate from the recycling line, the intake of which is inserted into the crystallizer when used. This withdrawal is often enough to keep a concentration of seed crystals of 225 g./liter present in each crystallizer.

Samples of the contents of each vessel are taken from time to time for analysis and at the conclusion a materials balance is obtained by recovering the contents of each vessel. The results are:

Concentration of α-methylDOPA (g./liter)—
    Dissolver _____ 55–58
    D-crystallizer _____ 50–53
    L-crystallizer _____ 50–53
Product quality (specific rotation of Cu complex at 546 mµ)—
    D _____ −152°
    L _____ +152°
Productivity—1–9 g./liter/hour
Material balance—
    Input:                                                G.
        DL _____ 832.0
        D-seed _____ 301.0
        L-seed _____ 301.0
    Output:
        D _____ 429.6
        L _____ 422.1
        DL solids in dissolver _____ 257.0
        DL in liquors _____ 221.8
        Lost in washes _____ 34.9
        Lost in sampling _____ 25.0
Net product—
    D _____ 128.6
    L _____ 121.1

We claim:

1. The process of obtaining a substantially pure enantiomorph of α-methyl-3,4-dihydroxyphenylalanine from the racemic form of said compound which comprises contacting a solution of said racemic form with the desired enantiomorph in crystalline form, in a polar solvent selected from the group consisting of water, lower alkanols, dioxane, acetone and mixtures thereof, said polar solvent comprising at least 10% water when other than a lower alkanol, the said solution being supersaturated in the desired enantiomorph and containing 0 to 90% of said alanine compound in the form of the amine salt of a salt-forming acid, the said salt-forming acid being a water-soluble, nomamphoteric acid having at least one acidic hydrogen with an ionization constant greater than $10^{-3}$, whereby additional amounts of said desired enantiomorph crystallizes.

2. The process of obtaining a substantially pure enantiomorph of α-methyl-3,4-dihydroxyphenylalanine from the racemic form of said compound which comprises contacting an aqueous solution of said racemic form with the desired enantiomorph in crystalline form, there being at least 5 g. per liter of said crystalline enantiomorph per liter of solution, the said solution being supersaturated in the desired enantiomorph and containing 0 to 90% of said alanine compound in the form of the amine salt of a salt-forming acid, the said salt-forming acid being a water-soluble, nonamphoteric, non-oxidizing acid having at least one acidic hydrogen with ionization constant greater than $10^{-3}$, whereby additional enantiomorph crystallizes.

3. The process of claim 2 in which the said supersaturated solution is formed by preparing a substantially saturated solution at a tempertature above 30° C. and below 90° C., separating any undissolved racemate and cooling the resulting solution at least 10° C.

4. The process of claim 2 in which said supersaturated solution is formed by preparing a substantially saturated solution of said racemic mixture in said salt-forming acid, separating the undissolved racemate and neutralizing a portion of said salt-forming acid by addition of a base.

5. The process of claim 2 in which said supersaturated solution is formed by:
    (a) preparing a saturated solution of said alanine
        (1) in water containing not more than 0.2 equivalent of hydrogen ion per mole of said alanine in solution,
        (2) at a temperature above 60° and below 100° C.
    (b) separating undissolved racemate
    (c) cooling said saturated solution to a temperature of 5–40° C., the said cooling being not more than 60° C.

6. The process of claim 2 in which said supersaturated solution is formed by preparing a substantially saturated solution of said racemate in an aqueous solution of said salt-forming acid, said salt-forming acid being sulfurous acid, separating the excess racemate and volatilizing a portion of the said sulfurous acid as its anhydride, sulfur dioxide.

7. The process of revolving racemic α-methyl-3,4-dihydroxyphenylalanine which comprises, in combination, the steps of
    (a) dissolving said racemate in a polar solvent selected from the group consisting of water, lower alkanols, dioxane, acetone and mixtures thereof containing 0 to 0.9 equivalent of a salt-forming acid per mole of said alanine, the said salt-forming acid being a water-soluble, nonamphoteric acid having at least one acidic hydrogen with an ionization constant greater than $10^{-3}$, the said polar solvent comprising at least 10% water when other than a lower alkanol,
    (b) separating any undissolved racemate,
    (c) forming a supersaturated solution of the dissolved racemate having from 0 to 90% of said alanine compound present as the amine salt of said salt-forming acid,
    (d) contacting said supersaturated solution with one of the enantiomorphs in crystalline form whereby additional of said enantiomorph over the amount of said enantiomorph added as seed crystallizes leaving a first mother liquor still supersaturated in the second enantiomorph,
    (e) separating said first mother liquor from said crystals and contacting it with the said second enantiomorph in crystalline form, whereby a portion of said second enantiomorph separates from said first mother liquor leaving a second mother liquor containing essentially racemate in solution.

8. The process of claim 7 in which the said salt-forming acid is a non-oxidizing acid having at least one acid hydrogen with an ionization constant greater than $10^{-3}$, the solvent comprises at least 10% water, the said crystalline enantiomorph seeds are present in quantities greater than 5 g. per liter of solution and the supersaturation of said first mother liquor in said alanine is increased after separation from said first enantiomorph and the said supersaturated solutions are formed by cooling at least 10° C. a substantially saturated solution formed at a temperature above 30° C. and below 100° C.

9. The process of claim 7 in which the said salt-forming acid is a non-oxidizing acid having at least one acid hydrogen with an ionization constant greater than $10^{-3}$, the solvent comprises at least 10% water, the said crystalline enantiomorph seeds are present in quantities greater than 5 g. per liter of solution and the supersaturation of said first mother liquor in said alanine is increased after separation from said first enantiomorph and the said salt forming acid is sulfurous acid and in which supersaturated solutions are formed by volatilizing a portion of the said salt-forming acid from the substantially saturated solution in the form of its anhydride, sulfur dioxide.

10. A process for resolving racemic α-methyl-3,4-dihydroxyphenylalanine which comprises, in combination, the steps of
    (a) dissolving said racemate in a polar solvent selected from the group consisting of water, lower alkanols, dioxane, acetone and mixtures thereof containing 0 to 0.9 equivalent of a salt-forming acid per mole of said alanine, the said salt-forming acid being a water-soluble nonamphoteric acid having at least one acidic hydrogen with an ionization constant greater than $10^{-3}$, the said polar solvent comprising at least 10% water than other than a lower alkanol, thus forming a saturated solution,
    (b) separating any undissolved racemate,
    (c) forming a supersaturated solution of the dissolved racemate in which from 0 to 90% of said alanine compound is present as the amine salt of said salt-forming acid and
    (d) contacting portions of said supersaturated solution with each of the enantiomorphs in crystalline form, whereby additional amounts of each enantiomorph over the amount of said enantiomorph added as seed separate.

11. The process of claim 10 in which the said salt-forming acid is a non-oxidizing acid having at least one acid hydrogen with an ionization constant greater than $10^{-3}$, the solvent comprises at least 10% water and the said crystalline enantiomorph seeds are present in quantities greater than 5 g. per liter, and the said supersaturated solution is formed by cooling by at least 10° C., a saturated solution formed above 30° C.

12. The process of claim 10 in which the said salt-forming acid is an on-oxidizing acid having at least one acid hydrogen with an ionization constant greater than $10^{-3}$, the solvent comprises at least 10% water and the said crystalline enantiomorph seeds are present in quantitites greater than 5 g. per liter, and the said salt-forming acid is sulfurous acid and the said supersatured solutions are formed by volatilizing a portion of the said sulfurous acid from the precursor saturated solution in the form of its acid anhydride, sulfur dioxide.

13. The process of continuously resolving racemic α-methyl-3,4-dihydroxphenylalanine which comprises, in combination, the steps of (a) forming a solution of said racemate in a polar solvent selected from the group consisting of water, lower alkanols, dioxane, acetone and mixtures thereof, in which solution any salt-forming acid present is a water-soluble nonamphoteric acid having at least one acidic hydrogen with an ionization constant greater than $10^{-3}$, the said polar solvent comprising at least 10% water when other than a lower alkanol to form a substantially saturated solution of said racemate;

(b) continuously separating said saturated solution from undissolved racemate;

(c) continuously forming a supersaturated solution of the dissolved racemate having from 0 to 90% of said alanine compound present as the amine salt of said salt-forming acid;

(d) continuously contacting said supersaturated solution with one enantiomorph in crystalline form, whereby a portion of said enantiomorph separates from said supersaturated solution in crystalline form leaving a first mother liquor still supersaturated in the second enantiomorph;

(e) continuously separating said first mother liquor;

(f) continuously contacting said first mother liquor with said second enantiomorph in crystalline form, whereby a portion of said second enantiomorph separates in crystalline form, leaving a second mother liquor containing essentially racemate;

(g) continuously separating said second mother liquor and recycling it to the dissolving step;

(h) withdrawing a portion of the slurry from each of said crystallization steps, separating the crystallized enantiomorph and returning the filtrate to the cycle;

(i) maintaining solid racemate in the dissolving step and (j) the said separating of saturated solution, of first mother liquor and of second mother liquor being made at rates adjusted to keep a balanced flow around the cycle.

14. The process of claim 13 in which the said salt-forming acid is a non-oxidizing acid having at least one acid hydrogen with an ionization constant greater than $10^{-3}$, the solvent comprises at least 10% water, the said crystalline enantiomorph seeds are present in quantities greater than 5 g. per liter of solution and the supersaturation of said mother liquor in said alanine is increased after separation from said first enantiomorph said dissolving is carried out above 30° C. and said supersaturated solution is formed by cooling at least 10° C.

15. The process of claim 13 in which the said salt-forming acid is a non-oxidizing acid having at least one acid hydrogen with an ionization constant greater than $10^{-3}$, the solvent comprises at least 10% water, the said crystalline enantiomorph seeds are present in quantities greater than 5 g. per liter of solution and the supersaturation of said mother liquor in said alanine is increased after separation from said first enantiomorph the said salt-forming acid is sulfurous acid, the dissolving step being carried out by continuously introducing $SO_2$ into the slurry, the transformation into supersaturated solutions being carried out by sparging said saturated solutions with nitrogen to remove a portion of the $SO_2$.

16. The process of continuously resolving racemic α-methyl-3,4-dihydroxphenylalanine which comprises, in combination, the steps of (a) continuously forming a substantially saturated solution in a polar solvent selected from the group consisting of water, lower alkanols, dioxane, acetone and mixtures thereof, the said polar solvent comprising at least 10% water when other than a lower alkanol of said racemate in which any salt-forming acid present is a water-soluble nonamphoteric acid having at least one acidic hydrogen with an ionization constant greater than $10^{-3}$, (b) continuously separating said saturated solution from undissolved racemate;

(c) continuously dividing said solution into two approximately equal streams;

(d) continuously forming from each of said streams a supersaturated solution of dissolved racemate having from 0 to 90% of said alanine compound in the form of the amine salt of said salt-forming acid;

(e) continuously contacting each of said streams with one of the enantiomorphs in crystalline form, the one supersaturated solution being contacted with one enantiomorph and the other with the other enantiomorph;

(f) continuously separating the mother liquors of each such crystallization from the crystallized enantiomorph;

(g) ocntinuously combining said mother liquors and returning the combined stream to said dissolving step;

(h) maintaining solid undissolved racemate in said dissolving step, and (i) the said separating of saturated solution and mother liquors being made at rates adjusted to keep a balanced flow around the cycle.

17. The process of claim 16 in which said salt-forming acid is a nonoxidizing acid having at least one acid hydrogen with an ionization constant greater than $10^{-3}$, the solvent comprises at least 10% water and the said crystalline enantiomorph seeds are present in quantities greater than 5 g. per liter of solution.

18. The process of claim 17 in which said supersaturated solutions are formed by cooling by at least 10° C. a saturated solution formed above 30°.

19. The process of claim 17 in which said salt-forming acid is sulfurous acid and the said supersaturated solutions are formed by partially volatilizing the said dissolving acid from the precursor saturated solution in the form of its anhydride, sulfur dioxide.

20. The process of claim 18 in which said dissolving said is sulfurous acid and in which in the formation of said supersaturated solution some of the sulfurous acid is removed by volatilization of sulfur dioxide.

References Cited by the Examiner

UNITED STATES PATENTS 2,734,919  2/53  Amiard et al.

LEON ZITVER, *Primary Examiner.*